Feb. 23, 1971    YOOICHI HURUTA ET AL    3,564,849
PNEUMATIC BOOSTER ASSEMBLY FOR BRAKE SYSTEM
Filed May 29, 1968    6 Sheets-Sheet 1
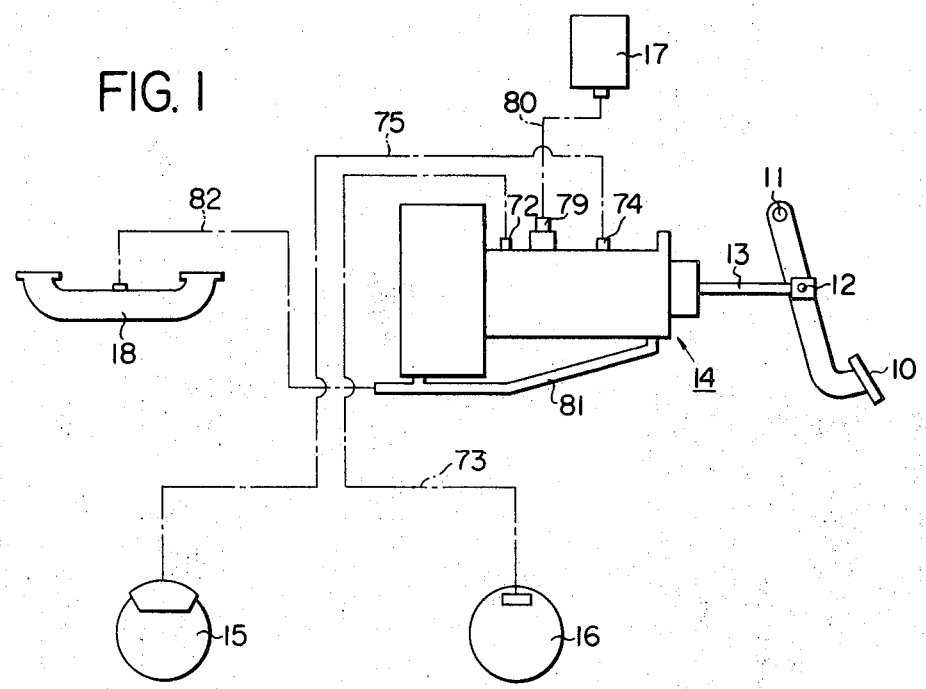
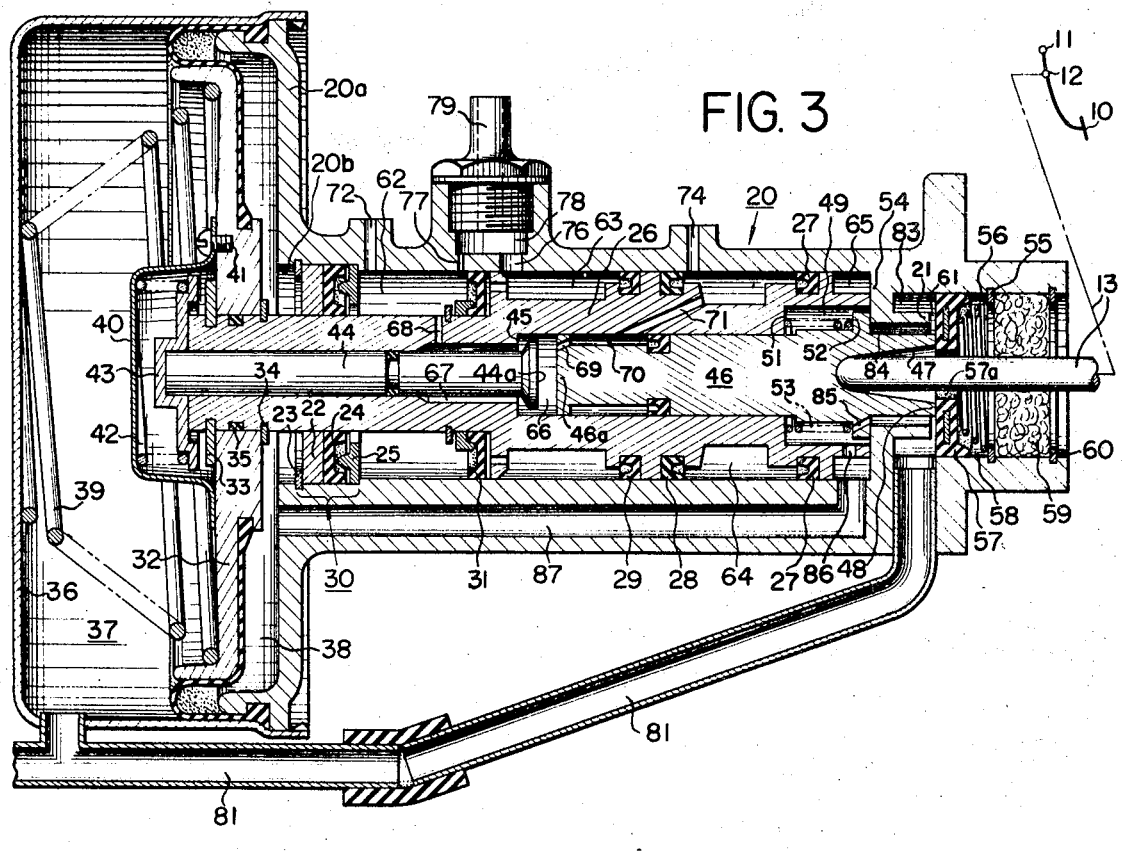

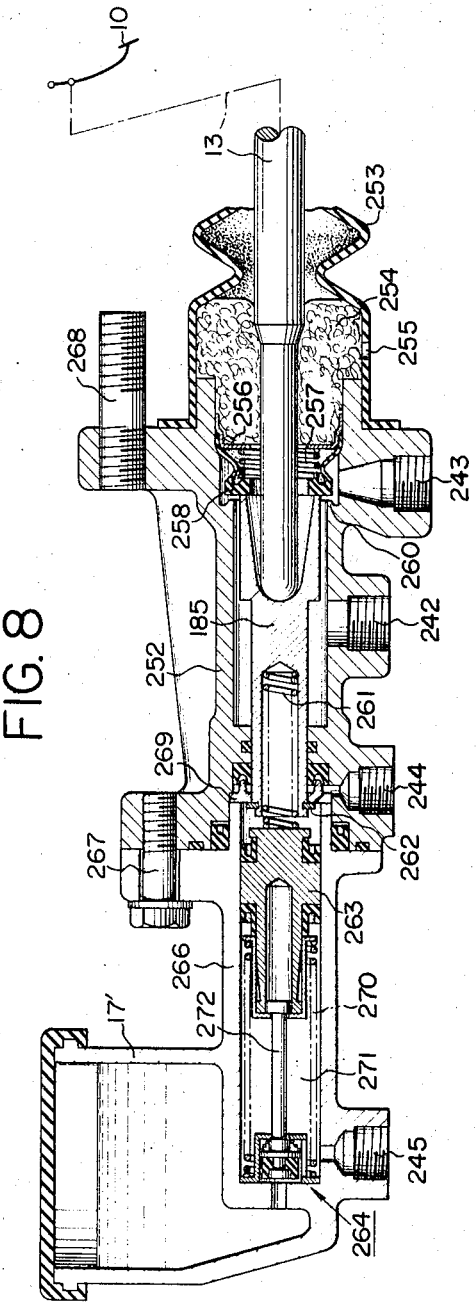
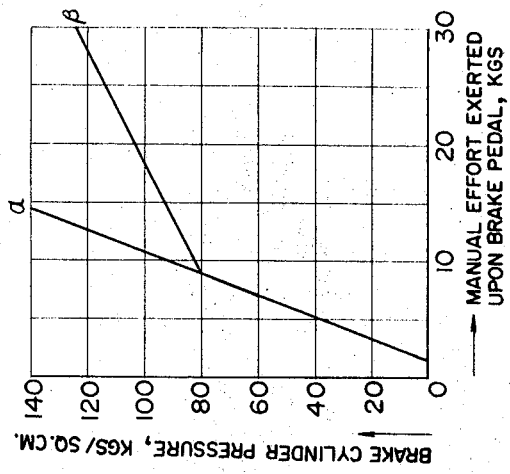
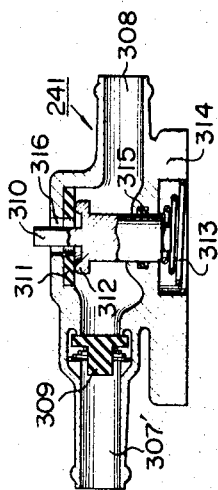

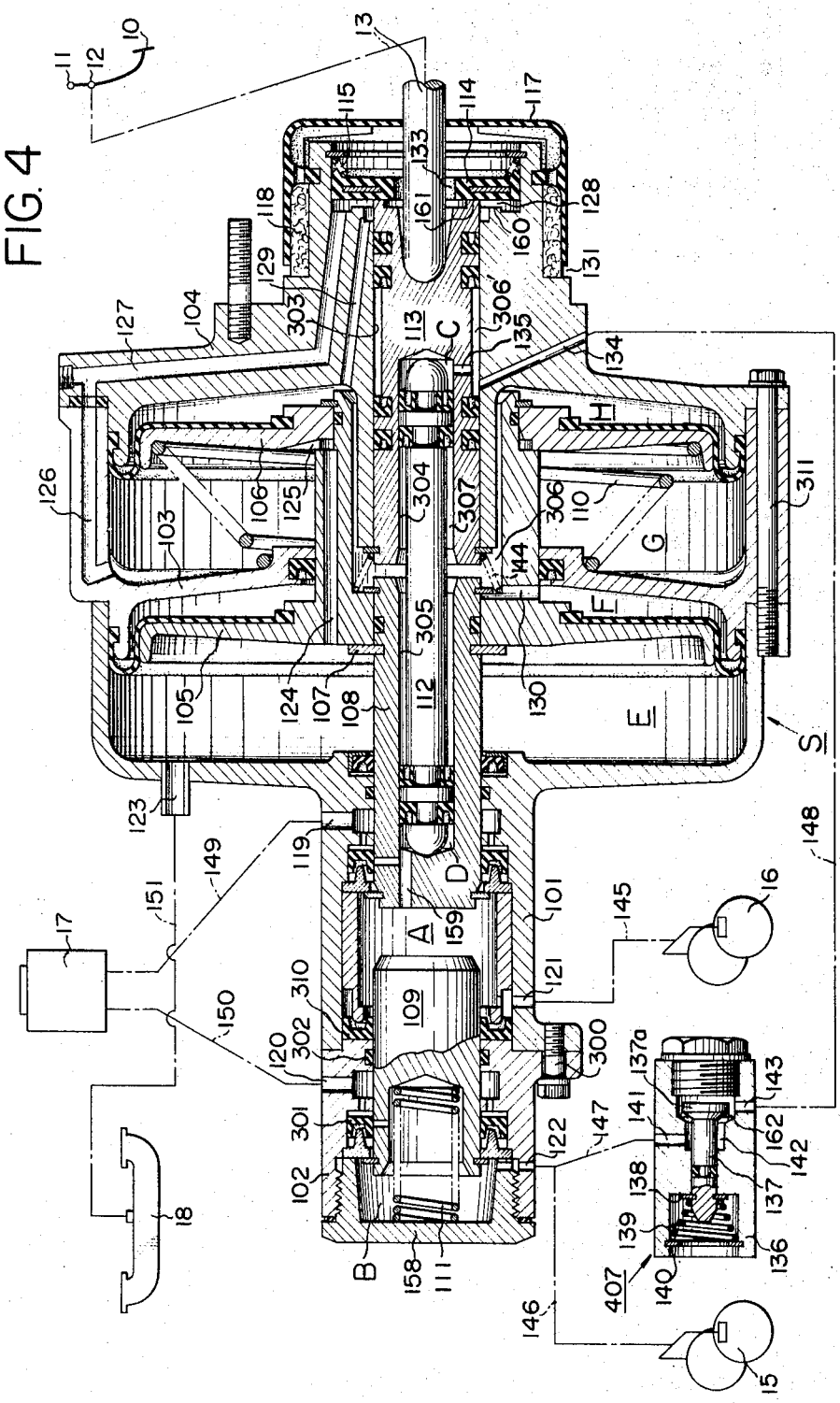

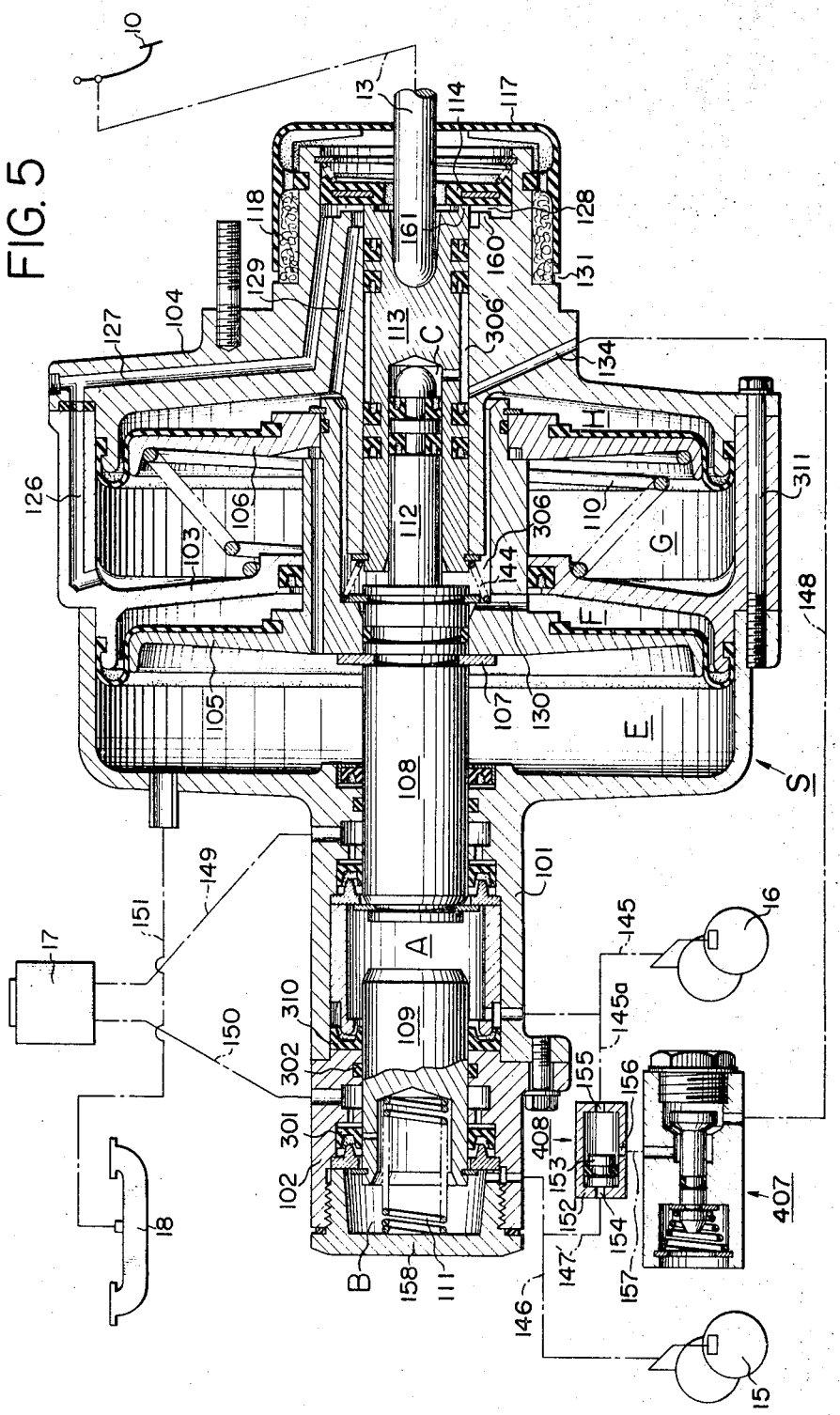

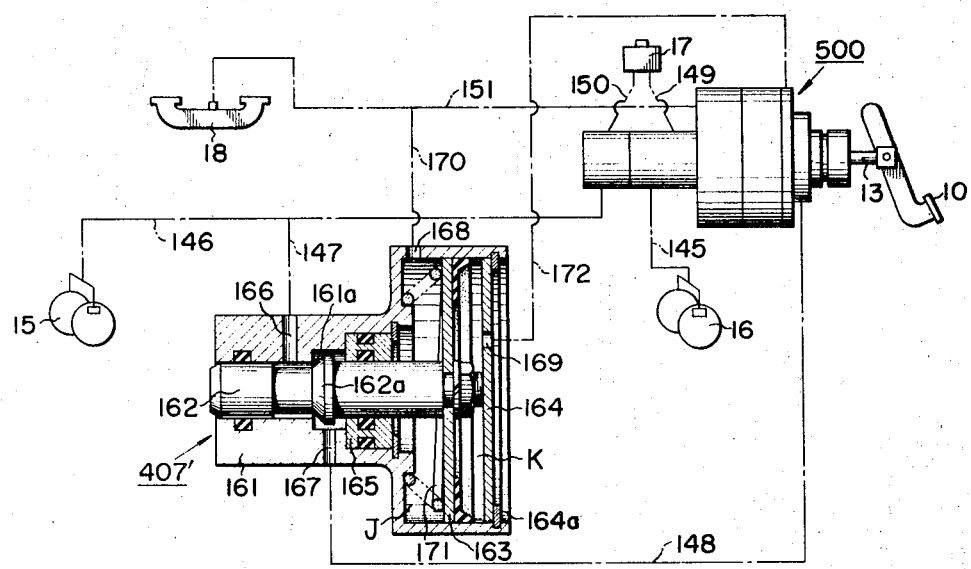

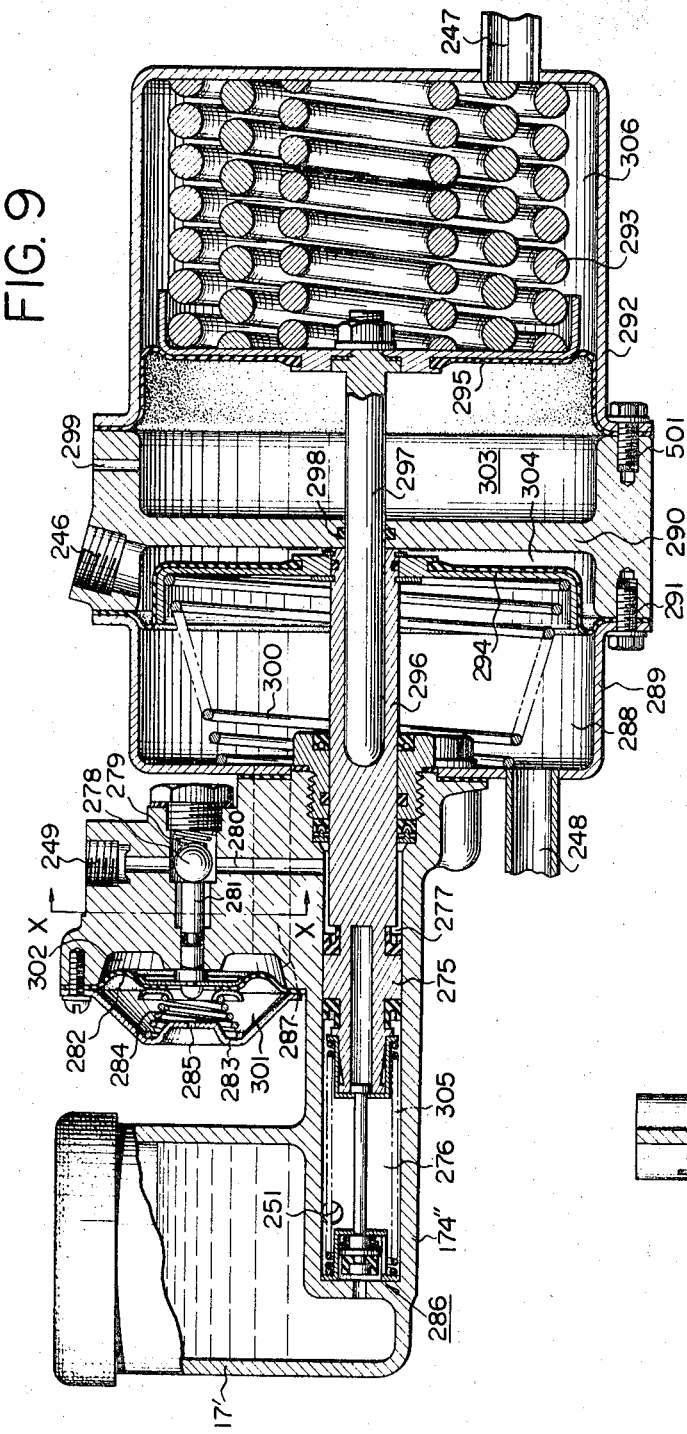
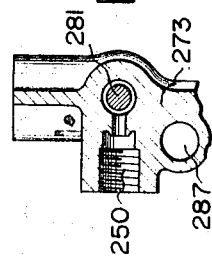

United States Patent Office 3,564,849
Patented Feb. 23, 1971

3,564,849
PNEUMATIC BOOSTER ASSEMBLY FOR
BRAKE SYSTEM
Yooichi Huruta and Yoshiharu Adachi, Kariya-shi, Japan, assignors to Aisin Seiki Company Limited, Kariya-shi, Aichi-ken, Japan, a corporation of Japan
Filed May 29, 1968, Ser. No. 733,075
Claims priority, application Japan, May 30, 1967, 42/34,708
Int. Cl. F15b 7/08, 9/10
U.S. Cl. 60—54.5        14 Claims

ABSTRACT OF THE DISCLOSURE

The invention provides a pneumatic servo- or booster assembly adapted for cooperation with a hydraulic automotive wheel brake system comprising a first hydraulic piston and a second hydraulic piston arranged to cooperate with a common hydraulic cylinder which is hydraulically connected with wheel brake cylinders, wherein locking means are provided within the master cylinder for the prevention of lost motion of the brake pedal, said lock means being effective only when the foot effort exceeds a predetermined servo range of said assembly.

---

This invention relates to improvements in a pneumatic booster assembly for a brake system, especially adapted for automotive use.

The above kind of booster or servo-assembly is commonly known, having such an object that a small manual operating effort exerted upon the foot pedal is boosted to a large hydraulic brake action to be exerted upon the automotive wheel brakes, through the intermediary of the pneumatic servo- or booster assembly. It has been experienced with this kind of pneumatic booster, that the brake pedal is liable to perform a kind of lost movement when the exerted manual, or more correctly, foot-operated effort upon the pedal is beyond a predetermined servo-function range. Even with continued and intensified effort applied upon the foot pedal beyond said functional range, the pressure in the master cylinder does not increase in the predetermined servo-ratio, but increases in its level only at a highly reduced rate.

It is therefore an object of the invention to provide an efficient and accurately operating pneumatic servo- or booster assembly for use in a wheelbraking system, especially adapted for automotive use.

A further object of the invention is to provide a pneumatic booster assembly of the above kind which functions in such a way that even when the manual braking effort is beyond the designed servo-range upon the foot- or brake pedal, the latter can be regularly manipulated without being subject to a dangerous lost motion and the master cylinder pressure can be increased at the predetermined regular rate as a function of the applied manual force.

Still another object of the invention is to provide an improved pneumatic booster assembly which is provided with means adapted for preventing the aforementioned lost motion of the brake pedal, if the manual pressure should be beyond the designed servo-range of the booster assembly.

These and further objects, features and advantages of the invention will become more apparent when read the following detailed description of two preferred embodiments of the invention shown in the drawings. The embodiments are shown only for the purpose of illustration only and thus in no limiting sense of the invention.

In the accompanying drawings:

FIG. 1 illustrates schematically a general arrangement of an automotive wheel brake system which is provided with the pneumatic booster assembly in the form of the first embodiment of the invention shown in FIG. 3.

FIG. 2 is a diagram showing the brake cylinder pressure plotted against the manual braking effort applied to the brake pedal, appearing in the pneumatic booster shown in FIG. 3.

FIG. 3 is a longitudinal section of the first embodiment of the invention.

FIG. 4 is a similar view to FIG. 3, illustrating a second embodiment of the invention.

FIG. 5 is a similar view to FIG. 3, illustrating a third embodiment of the invention.

FIG. 6 is a longitudinal sectional view of a modification of the pressure control valve employed in several foregoing embodiments, together with a schematic piping diagram related therewith.

FIG. 7 is a schematic diagram of an automotive brake system embodying the principles of the invention, illustrative especially of a still modified arrangement.

FIG. 8 is a longitudinal sectional view of a modified master cylinder assembly.

FIG. 9 is a longitudinal sectional view of a fifth embodiment of the invention.

FIG. 10 is a fragmental sectional view taken along the section line x—x in FIG. 9.

FIG. 11 is a sectional view of a modification from the emergency valve employed in the arrangement shown in FIG. 7.

Referring now to the accompanying drawings illustrative of the first embodiment of the invention, numeral 10 represents a conventional automotive brake pedal, foot operated, which is pivotable at 11. At an intermediate point 12 between the extremities of the pedal, a connecting rod 13 is connected at its one end with the pedal and at its opposite end with a pneumatic booster assembly 14 which will be described more fully hereinafter with reference to FIG. 3. Although as only one unit, the numeral 15 illustrates only schematically a pair of disc brake units attached to the front wheels of an automotive vehicle, not shown, which is fitted with the pneumatic brake booster assembly embodying the principles of the invention. Numeral 16 denotes similarly and only schematically rear wheel brake units, preferably the drum type, although only one unit is shown for simplicity of the drawing. Numeral 17 illustrates schematically a reservoir which contains therein a certain amount of pressurized liquid such as oil, while numeral 18 shows in a simplified way a vacuum source which may be of conventional design. Several connection pipings are also shown and will become clear as the description proceeds.

Next referring to FIG. 3, numeral 20 shows generally a master cylinder, commonly known to those skilled in the art, which is fitted with a ring-shaped valve seat 21 provided near the right-hand end of the cylinder and within the interior space thereof, a small gap 61 being normally established as shown between valve seat 21 and a valve member 57 adapted for cooperating therewith.

A plug member 22 is fixedly positioned on the shouldered inside wall surface 20b of the left-hand end part of said cylinder 20, by means of a retaining spring clip 23, together with a sealing ring 24 and a back-up ring 25. These members 22–25 constitute in combination a cylinder end seal assembly 30, generally shown at 30.

In the interior space of the cylinder 20, a first piston 26 is slidably mounted and protrudes outwardly of the cylinder through the assembly 30. Several sealing members 27, 28, 29 and 31 are mounted on the piston 26 for assuring an effective slidingly sealing relation between the piston and the cylinder.

The protruding end of the first piston is rigidly connected with a servo- or booster piston 32, the retaining members 33 and 34 serving for this purpose and a sealing ring 35 serving for establishing a sealingly tight connection between the said both pistons. Booster piston 32 is housed in a booster cylinder 36, the interior space thereof being divided into two chambers 37 and 38. The cylinder housing 36 is sealingly press-fit onto the periphery of a lateral flange 20a which is integral with the master cylinder 20. A spiral spring 39 is contained in the chamber 36 and abuts at its one end against the outer wall of said booster cylinder and kept at its other end in pressure engagement with the booster piston 32.

The spring 39 acts through the booster or servo-piston 32 upon the first piston 26 to return it to the neutral position shown in FIG. 3, when the booster assembly is in its off-service position.

A small and concentric casing 40 is fixedly attached to booster piston 32 by means of a plurality of set screws 41 of which only one is shown. A coil spring 42 is housed in the casing 40 and is adapted for acting resiliently through a mounting plate 43 upon a valve piston 44 which is slidably mounted in the most reduced part of the multi-shouldered axial bore of the first piston 26. The centrally recessed plate 43 is press-fit onto the outer or left-hand extremity of the valve piston 44 which has an enlarged head 44a at the inner or right-hand extremity, said head being adapted for acting as a valve member which cooperates with a seat, at 45, formed at an intermediate point in the axial bore of first piston 26. It will be thus seen that the spring 42 urges the valve piston number 44 to move axially rightwards, so as to keep the valve head 44a in its open position relative to the valve seat 45.

Within the multi-stepped bore of the first piston 26, there is a reaction piston 46 which has at its outer end with a rounded cone-shaped recess 47 and a second air-valve seat 48 defining the outermost part of said recess which receives the inner extremity of the connecting rod 13. There is a space 49 defined by a shoulder 51 on the first piston and a second shoulder 52 on the reaction piston and a coil spring 53 is kept under tension in the said space, thus the latter piston is urged to move in the right-hand direction in FIG. 3 and held in the position shown by abutting against an inwardly directing lateral shoulder 54.

A spiral spring 56 is kept in position by the pressure engagement with a retainer 55 formed into a spring clip and acts resiliently upon the resilient and centrally bored valve member 57 which is slidably mounted in a counter bore 58 formed at the right-hand end of the master cylinder 20.

Near the right-hand extremity of the cylinder 20, there is provided in said counter bore 58 a second retainer 60 similar to the first retainer 55 and a fibrous air-filter material 59 such as a mass of asbestos fibers is filled in a substantial part of the counter bore ranged between the retainers 55 and 60, so as to form an air filter mass. In the position shown, the valve member 57 is kept in resilient and pressure engagement with the second or inner valve seat 48. On account of the provision of several sealing means 27, 28, 29 and 31 on the first piston, the ring space formed between the cylinder 20 and first piston 26 is divided into four chambers 62, 63 and 65, respectively. In the longitudinal bore space of the first or hollow piston 26, there is provided a small chamber 66 substantially ranged in the axial direction by the valve head 44a and the inner end 46a of reaction piston 46.

In the off-service position of the booster assembly, as shown in FIG. 3, the inner piston chamber 66 is kept in fluid communication with said chamber 62 through a ring space 67 around valve piston 44 in proximity to the valve head 44a and a lateral opening 68 laterally bored through the wall of the hollow piston 26. In the similar way, the space 66 is kept, in this case, in fluid communication with the chamber 64 through an inclined passage 69 drilled through the extremity of reaction piston 46, a recessed space 70 formed on the latter and an inclined passage 71 formed through the wall of said hollow cylinder.

Chamber 62 is kept in fluid communicatiton through a lateral opening 72 drilled through the wall of the master cylinder 20 and a connection piping 73 to the drum brake units 16, as shown substantially in FIG. 1.

Chamber 64 is fluidically connected through a second lateral opening 74 drilled again through the wall of the cylinder 20 and a connection piping 75 to disc brake units 15 (FIG. 1).

Chambers 62 and 63 are kept in fluid communication with a common discharge opening 78 provided in the wall of said cylinder 20, said opening 78 being further connected through a screwed socket 79 and a piping 80 to the interior of the liquid reservoir 17.

Piping 81 connects the booster chamber 37 through a connecting piping 82 with vacuum source 18, FIG. 1, on the one hand, and the both chambers 37 and 83, on the other hand, the latter being formed into a ring space in the master cylinder 20, as shown in FIG. 3, in close proximity of the first or outer valve seat 21. The connection pipings 73, 75, 80 and 82 are shown only schematically in FIG. 1 by chain lines.

In the rest position shown in FIG. 3, a vacuum is supplied from vacuum source 18, through pipings 82 and 81 to the chambers 37 and 83, thence through the gap 61, an intermediate ring space 84 formed between master cylinder and reaction piston, an inclined passage 85 provided in the reaction piston, spring chamber 49, a lateral passage 86 through the wall of hollow piston 26, a duct 87 formed through the wall of master cylinder 20 to the second chamber 38 in the booster. Thus, both chambers 37 and 38 are maintained with equal vacuum.

The operation of the aforementioned booster assembly is as follows:

When the operator of the automotive vehicle fitted with the above-mentioned mechanism depresses the foot-operated brake pedal 10 as conventionally done to swivel it about its pivot 11 in the clockwise direction, the push rod 13 will exert a pressure onto the reaction piston 46 which is thus caused to move in the leftward direction in FIG. 3. The resilient control valve member 57 will therefore follow up the advanced reaction piston, thereby closing the normally opened gap 61. In other words, the valve member is brought into pressure engagement with the first or outer valve seat 21 and the outer ring chamber 83 is fluidically interrupted from the inner similar chamber 84.

With further leftward axial displacement of the reaction piston, a gap will be formed between the valve member 57 and the second or inner valve seat 48, thereby allowing ambient atmosphere to enter through the fibrous filter mass 59, spring chamber 58 and the ring space at 57a formed between the bore wall of the valve member and the push rod 13 into the annular space 84, thence through inclined passage 85, spring chamber 49, lateral passage 86, annular chamber 65 and communication duct 87 into the booster chamber 38, thereby creating a pneumatic pressure difference between the chambers 37 and 38.

By this pressure difference, the booster piston 32 will move leftwards in FIG. 3 against the action of the urging spring 39. The first piston 26 rigidly coupled with the booster piston will naturally perform the same displacement, thereby subjecting the mass of the hydraulic liquid contained in the chamber 62 to a compression. Therefore, part of the liquid will escape from the chamber 62 through the passage opening 72 and the piping 73 into the brake cylinders, not shown, for the drum brake units 16. On the other hand, the compressed liquid is conveyed from the chamber 62 through lateral passage 68, annular space 67, interpiston space 66, inclined duct 69, annular space 70, inclined passage 71, annular chamber 64, passage opening 74 and piping 75 into the brake cylinders of disc brake units 15.

The increased liquid pressure now prevailing in the interpiston chamber will cause the reaction piston 46 to move rightwards in FIG. 3, thereby actuating the control valve in response to the degree of foot pressure exerted upon the push rod 13 through pedal 10.

When the increased liquid pressure in the chambers 62 and 66 amounts to a predetermined value, the valve piston 44 is caused to move leftwards in FIG. 3 against the action of spring 42, thereby causing the valving head 44a of the piston to be brought into pressure engagement with the cooperating valve seat 45 and the hitherto established fluid communication between the chambers 62 and 66 being separated from each other.

With still further continued actuation of foot pedal 10, the hydraulic pressure of the interpiston space 66 is caused to increase by the pressure exerted upon the reaction piston by the pusher rod 13. In this case, the rate of pressure increase in the said space 66 is larger than the pressure increase in the annular chamber 62, since the effective actuating area of the reaction piston is selected to be considerably smaller than that of the first piston.

In the piping scheme shown in FIG. 1, the thus increased hydraulic pressure is conveyed from the interpiston chamber 66 through passage 71, chamber 64, passage 74 and piping 75 to the disc brakes 15, as already referred to. This arrangement is naturally only a preferred one and may be modified as occasion may desire. In the assembly shown in FIG. 3, the passage openings 72 and 74 serve for actuation of separate brake systems. In a modification thereof, the passage 72 may be plugged and only the remaining one at 74 may serve simultaneously for the both braking systems. Or alternatively, the latter passage opening 74 may be plugged and the other at 72 may serve for the both brake systems.

In the diagram shown in FIG. 2, the piping pressure has been plotted against the manual effort exerted upon the foot brake pedal. The curve α represents the behavior in the disc brake piping adapted for automotive front wheels, as an example, corresponding to the hydraulic pressure prevailing in the interpiston space 66. The curve β shows the behavior prevailing in the piping for the drum brake adapted for automotive rear wheels. From the diagram, any person skilled in the art will easily acknowledge that the shown characteristics are highly suitable for rear wheel braking service.

Briefly, the predominant feature of the first embodiment of the invention so far shown and described resides in the intentional interruption between the chambers 62 and 66 by bringing the valve 44a into its closing and cooperating position with the valve seat 45, when the hydraulic pressure prevailing in the chamber 66 amounts to a certain predetermined value. On the contrary, the corresponding conventional arrangement is such that when the pusher rod 13 is further advanced by a continued operation of brake pedal 10 beyond such a point that the pressure differential across the booster piston 32 has been attained at a predetermined pressure increase prevailing in said chamber 62, the reaction piston is caused frequently and unintentionally to move a certain distance, regardless of the increased pressure, which is a considerable drawback in the art.

Next referring to FIG. 4, the second embodiment of the invention will be described in detail.

In this assembly shown, numeral 101 denotes a first cylinder contains partially and slidably a first piston 108 and formed with a vacuum cylinder assembly S at the right-hand side thereof, the cylinder chamber of the first cylinder being denoted A. Numeral 102 represents a second cylinder which is closed at its left-hand end by a screw cap 158, so as to form a chamber denoted B. These cylinders are rigidly bolted together as at 300. A second piston 109 is mounted slidably in the second cylinder 102 and sealing means 301 and 302 are provided for establishing an effective slidable seal therebetween. This piston 109 protrudes partially into the cylinder chamber A which is provided with a sealing means 310 for sealing against said piston. Coil spring 111 is tensioned between cap 158 and piston 109 which is kept normally in the position shown.

The first piston 108 is fixedly connected with booster pistons 105 and 106. Provision of spiral spring 110 serves for positioning normally the double piston assembly 105–106 as shown.

Vacuum cylinder 103 is rigidly united with the first cylinder 101 and the thus formed cylinder space is divided by the booster piston 105 into two chambers denoted E and F as shown. Cover 104 is rigidly attached as at 311 to the vacuum cylinder 103, the interior space of which is divided by the booster 106 into two separated chambers denoted G and H. Cover 104 is formed with an axial bore 303 in which a reaction piston 113 is slidably and sealingly mounted. Reaction piston 113 is formed with a bore 304 and similarly the first piston is provided with an axial bore 305, said bores 304 and 305 receiving slidably and sealingly an elongated second reaction piston 112. In the bore 305, there is provided a chamber D defined partially by the left-hand end portion of the second reaction piston. The chamber D is fluidically connected through a passage 159, formed through the end wall of the hollow piston 108, with the cylinder chamber A. Within the bore 304 at its outer extremity, there is provided a chamber C defined partially by the right-hand extremity of the piston 112. The chamber C is connected fluidically through a lateral passage opening or port 135 drilled through the wall of reaction piston 113, a ring space 306' formed on the same piston and a slightly inclined passage bore 134 drilled through the cover 104, to a piping 148 only schematically represented by a chain line. There is provided an urging spring 144 which serves to exert a resilient pressure upon the reaction piston 113 kept in its off-service position in the right-hand extreme position shown, urging a resilient and control valve member 114 against the action of spiral spring 115 to such a position in which a small gap 128 is formed and maintained between valve member 114 and a stationary valve seat 160 formed on said cover 104, so as to establish a fluid communication between two fluid passages 127 and 129 which are formed through the said cover.

In the off-service position of the booster assembly, the chamber E is connected fluidically through socket 123 and piping 151 to the vacuum source 18. On the other hand, the chamber E is fluidically connected through passage 124 formed through the boss of vacuum piston 105 and a further passage 125 formed on another vacuum piston 125 to chamber G which is connected fluidically through passages 126 and 127, valve gap 128, passage 129 with a chamber H, the latter being partially defined by piston 106. The chamber F is connected fluidically through passage 130, chamber 306 housing the spring 144, and ring space 307 with the chamber H. Thus, it will be clearly seen that several chambers E, F, G and H are kept in communication and a certain and common negative pressure is prevailing in these chambers.

Port 120 formed through the cylinder wall 102 communicates through a piping 150 with the conventional liquid reservoir 17. In the similar way, port 119 formed through the cylinder wall 101 is fluidically connected through a piping 149 with the same reservoir 17. Port 121 drilled through the cylinder wall 101 communicates through a piping 145 to wheel brakes 16. Port 122 bored through the cylinder wall 102 communicates, on the one hand, through a piping 146 with wheel brakes 15, and, on the other hand, through a piping 147 to a port 141 provided in a pressure control valve assembly, generally shown at 407. This assembly comprises a cylinder 136 which contains valve piston 137, urging spiral spring 139 and spring retainer 140, as shown. A stop ring 138 is mounted on said piston 137 which has an enlarged end 137a acting as valve member adapted for cooperation with a valve seat 162 formed on the inside wall surface of the cylinder 136. Another port 143 cut through the cylinder wall 136 is connected with said piping 148. When the valve is opened as shown, port 141 is kept in communication through a ring space 142 formed around the valve piston and the valve gap at 162 with the port 143. Thus, in the position shown, port 141 is kept in fluid communication with the chamber B, and port 143 with the chamber C. In effect, the chambers B and C are kept in communication with each other. As seen, the bore of the cylinder chamber C is designed to be larger than that of the chamber D. The operation of the booster shown in FIG. 4 is as follows:

When the driver actuates the brake pedal 10, motion is transmitted therefrom to pusher rod 13, urging the reaction piston 113 to move in the left-hand direction. Simultaneously, the valve member 114 is moved in the same direction by the urging force provided by spring 115, thus being brought into the valve closing position in cooperation with the valve seat 160. Communication between the passages 127 and 129 is thus interrupted.

With further advancing movement of pusher rod 13, reaction piston 113 moves naturally further in the same direction, thus the second or movable valve seat 161 formed on the right-hand extremity of the piston recedes from contact with the valve member 114, thereby forming an air gap between the both, acting as a fluid passage. Under these conditions, air will invade from ambient atmosphere through inlet port 131, a mass of air-filter material 118, inside space of resilient cap 117, ring passage 133 formed through the valve member 114, valve gaps defined by the stationary valve seat 160 and the movable valve seat 161, and the passage 129 into the chamber H, thence through passage 130 and the like into the chamber F.

Therefore, a pressure difference will occur between chambers E and F, as well as between chambers G and H, respectively, and the double piston 105–106 will move in the left-hand direction against the action of the urging spring 110, which motion is naturally transmitted through the retainer 107 to the first hydraulic piston 108 and the pressure of the liquid contained in the chamber A is correspondingly increased. By this increased hydraulic pressure, the second hydraulic piston 109 is also moved in the left-hand direction, thereby increasing the liquid pressure in the chamber B substantially to that prevailing in the chamber A. The thus increased hydraulic pressure in the chamber A is transmitted through piping 145 to the brake units 16, while the liquid pressure in the chamber B is conveyed through piping 146 to another set of brake units 15. Simultaneously, oil pressure in the chamber B is transmitted through piping 147, port 141, passage 142, valve gap 162, piping 148, ports 134 and 135 to the chamber C, for generating a reaction on the part of the piston 113 to control thereby the control valve.

When the oil pressure in the chamber B reaches a predetermined value, the valve piston 137 is urged to move against the action of spring 139 in the left-hand direction, thereby the valve head 137a being brought into contact with the valve seat 162 and communication between the ports 141 and 143 being positively interrupted. Communication between the chambers B and C is thus shut off. With further continued actuation of the brake pedal 10, pusher rod 13 will urge the first hydraulic piston 108 to move in the left-hand direction so that the pressure in the chambers A and B will be increased correspondingly.

In the present embodiment, the arrangement can also be modified so as to perform the control of the both groups of brake units 15 and 16 in a common and unified mode, as was referred to hereinbefore with reference to FIG. 3. Even if an operational failure should occur with one of the both braking systems, the remaining one could effectively function. Now assuming that the first braking system including the chamber A has been clogged, the first hydraulic piston 108 will act directly upon the second hydraulic piston 109 and therefore the same action will be performed. On the contrary, when troubles should occur with the brake system including the chamber B, the pressure prevailing in the chamber D is transmitted through piston 112 to piston 113, thereby assuring a properly controlled braking operation.

In the third embodiment of the invention shown in FIG. 5, the second reaction piston denoted 112 in the second embodiment shown in FIG. 4 has been dispensed with by the provision of a change-off valve 408.

This change-off valve 408 comprises a piston 153 slidably contained in a cylinder 152 which is formed with ports 154, 155 and 156. Port 154 communicates through a connection piping 147′ with the chamber B, while port 155 is kept in fluid communication through a branch piping 145a and the piping 145 to the chamber A. Port 156 communicates through a piping 157 to the port 141 of the pressure control valve assembly 407, thence further through piping 148, duct 134, ring chamber 306′ and port 135 with the chamber C, the latter connection being however established only in the off-service period.

In the operation of the present embodiment, the increased liquid pressure in the chamber A is transmitted through port 121, pipings 145 and 145a, ports 155 and 156, piping 157 and port 141 and so on to the chamber C. When the hydraulic pressure reaches a certain predetermined value, the communication between the chambers A and C is interrupted.

When troubles should happen to take place with the braking system including the chamber B, the braking action can be performed as in the foregoing second embodiment. On the contrary, when troubles should happen to take place with another braking system including the chamber A, the increased oil pressure caused by the advanced piston 108 acts directly upon the second piston 109, thereby the hydraulic pressure in the chamber B will be correspondingly increased. This increased hydraulic pressure will act upon the control piston 153 of the change off valve assembly 408 to move in the right-hand direction, thus the ports 154 and 156 being brought into communication with each other and the pressure in the chamber B being transmitted to the chamber C. The reaction is thus transmitted to the first reaction piston 113.

Other functions are similar to those obtained with the third embodiment shown in FIG. 4. Therefore, these further operations could be easily understood from the foregoing description by reference of the numerous and similar reference numerals which are shown also in FIG. 5. In the fourth embodiment shown in FIG. 6, difference resides substantially in the modified pressure control valve assembly denoted herein 407′.

The present control valve assembly 407′ comprises a cylinder 161 and a piston 162 slidably arranged therein. This piston 162 is mechanically coupled with a vacuum piston 163 which is urged resiliently by a spring 171 to move in the right-hand direction.

A plate 164 is ported at 169 and kept in position by a spring retainer ring 164a. Sealing unit 165 effectively seals off the piston 162 at its intermediate point between its extremities. Valve collar 162a made integral with the piston is adapted to cooperate with a valve seat 161a formed on the inside wall of the cylinder 161. One of the piston chambers at J communicates through a port 168 and a piping 170 with the vacuum source 18, while port 169 communicates through a piping 172 to the chamber H which is shown in FIG. 4. In addition to the chamber J, the vacuum section includes a further chamber K which is separated from the first chamber J by the vacuum piston 163 and provided with said port 169.

The operation of the fourth embodiment is as follows:

When the driver actuates the brake pedal 10 as before, the pneumatic booster assembly denoted generally 500 and having a similar construction and function as before will be actuated in the similar manner.

Therefore, atmospheric air will invade into the chambers H and K shown in FIGS. 4 and 6. A pressure difference will thus be generated between the chambers J and K and when the difference reaches a certain predetermined value, vacuum piston 163 will move against the action of spring 171 in the left-hand direction, accompanying the valve piston 162. Therefore, the valve 162a is brought into closed position with valve seat 161a. Thus, communication between the pipings 146 and 148 is interrupted.

Other operations are substantially same as before.

Next, the fifth embodiment will be described with reference to FIGS. 7–11.

The master cylinder 239 shown in FIG. 7 is illustrated in detail in FIG. 8. In FIG. 9 the details of the booster assembly 240 are shown.

Referring now to FIG. 8, a control piston 185 is contained in the valve body at 252, the right-hand extremity of the piston constituting a movable valve seat as before.

Control piston 185 is urged resiliently by a spring 261 to move in the right-hand direction, the moving range being limited by snap spring 262 attached thereto by abutting against the sealing and stop assembly 269.

Valve member 258 is positioned by a retainer 256 fixed on the inside wall surface of the valve body 252 in a sealed manner and subjected to a resilient pressure in the valve closing direction, exerted upon by a spring 257 having a weak spring action relative to the spring 261. At the left-hand extremity of the valve body, it is attached with a resilient boot 253 in which air cleaner 254 is provided. The right-hand extremity is deeply recessed as before for receiving the actuating end of pusher rod 13 and providing a second or movable valve seat for the valve member 258, as in the similar manner as before.

The valve body 252 is bolted at its left-hand extremity with a master cylinder 266 as at 267, said cylinder being provided with a liquid reservoir 17' made integral therewith.

Master cylinder 266 forms therein with a cylinder space 271 and slidably contains a piston 263 which is fitted with a valve assembly 264. The piston 263 is urged by a spring 270 to move in the right-hand direction, the movement being however limited by the provision of stay rod 272. The cylinder space 271 is fluidically connected through a port 245 to one of the front wheel brake cylinders at 183. The valve body 252 is adapted to fix onto the chassis of an automotive vehicle, not shown, by a plurality of fixing bolts as at 268.

Port 244 is fluidically connected to another front wheel brake cylinder at 244 (FIG. 7), on the one hand, and to an inlet port 249 of the booster assembly 240.

Port 242 is fluidically connected at port 246 of the assembly 240. Port 243 communicates with port 248 of said assembly, on the one hand, and with a port 307' of an emergency valve assembly 241'.

In the booster assembly shown in FIG. 9, the pressure control valve assembly is attached fixedly to the master cylinder body at 174" which is fixedly attached at its right-hand extremity with power cylinder 289. As before, liquid reservoir 17' is fixedly and integrally attached to the left-hand extremity of the body 174", the communication of the reservoir with the cylinder chamber 276 being controlled by the valve assembly 286.

Cylinder chamber 276 is kept in communication through port 251 with rear wheel brake cylinder 225 (FIG. 7), and with a port 250 of the pressure control assembly.

Piston 275 is rigidly connected with a booster piston 294 which separates the interior space defined by the power cylinder 289 and the partition wall 290 into two spaces 288 and 304. Piston 294 is urged by the springs at 305 and 300 to move in the right-hand direction. Ball valve 278 is urged by a spring 279 to make pressure contact with a valve piston 281 which is fixedly attached at its left-hand extremity with a valve diaphragm 282 establishing two chambers 301 and 302 at its both sides and defined by a cover 283, on the one hand, and by a part of the body 174", on the other hand. Pressure valve chamber 302 communicates through a passage 287 to the chamber 288, while the chamber 301 communicates through a small port 285, drilled through said cover, to ambient atmosphere.

Chamber 277 communicates through passage 280 and port 249 to port 244 of valve body 252 (FIG. 8). On the other hand, chamber 288 communicates through port 248 to a port 243 shown in FIG. 8. Chamber 304 communicates through port 246 to a port 242 shown in FIG. 8.

Rod 297 invades partially into the piston 298 after passing through the separating wall 290, said rod being attached at its right-hand end with an emergency piston 295 which separates the interior space defined by said separating wall 290 and emergency cylinder 292 into two chambers 303 and 306. Emergency spring 293 is kept under compression between the end wall of said emergency cylinder 292 and emergency piston 295. Emergency cylinder 292 and separating wall 290 are rigidly bolted together as at 501.

Chamber 306 is kept in communication through port 247 and emergency valve 241 to a vacuum reservoir 229, thus being kept in vacuo at a high degree. Urgent piston 295 compresses the emergency spring 293 by receiving the pressure difference between the chambers 303 and 306.

Now referring to FIG. 11 illustrative of the emergency valve.

Opening 300 is connected with port 247 and opening 307' communicates with the vacuum reservoir 229 shown in FIG. 7. Check valve 309 acts to prevent the degree of vacuum at 306 in FIG. 9, when the vacuum in the vacuum reservoir 229 is lowered.

Valve rod 310 has a stepped construction and is urged by a spring 313 so as to move upwardly towards the valve seat at 311. Sealing means 315 is provided between valve rod 310 and valve casing 314 for preventing unintentional invasion of the ambient atmosphere into the interior of the valve casing. The valve rod 310 is so designed and arranged that the practical stroke of brake pedal 10 exceeds a certain predetermined value, the movement of the pedal is directly transmitted to the rod.

The operation of the last embodiment so far shown and described is as follows:

When the brake pedal 10 is actuated, pusher rod 204 is also energized to move the control piston 185 in the left-hand direction, thereby the valve 258 being moved also in the same direction and brought into pressure contact with valve seat 260. Communication between ports 242 and 243 is interrupted. Further, control piston 185 will disengage from contact with valve 258, and through port 255, air-filter mass 254 and port 242 into the chamber 304, thereby the booster piston 294 being urged to move in the left-hand direction. The power generated by the piston 294 will be converted into a corresponding increase of hydraulic pressure in the cylinder chamber 276, which pressure will be transmitted through port 251, and will act upon the right-hand surface of piston 263, the left-hand end of the control piston 185, the right-hand end of the valve piston 281 and the pistons, not shown, of the front and rear wheel brake cylinders.

With further increase of the manual effort acted upon the brake pedal, the control piston 185 will be moved in the left-hand direction and air is permitted to enter from the ambient atmosphere into the chamber 304. The thus increased hydraulic pressure, control piston will be further moved in the right-hand direction and the valve 258 is closed to control the invasion of outside air.

In this way, the pressure in the chamber 304 becomes nearly equal to the atmospheric pressure. Then, the force acting upon the valve piston 281 will become larger than the pressure difference between the chambers 301 and 302, added with the urging force acting upon the valve piston 281 in the right-hand direction, thus said valve piston being urged to move in the left-hand direction, thereby shutting off the communication between the cylinder chamber 216 and outlet port 249.

With further actuation of the brake pedal 10, the pressure caused thereby to take place will not act towards the cylinder chamber 276, but act upon the differential area between the cylinder chamber 276 and the right-hand extremity of the piston 296. The degree of pressure increase in the cylinder chamber 276 is less than the increase of the hydraulic pressure prevailing at the left-hand side of the control piston 185. Therefore, in this case also, the optimum characteristic performance as shown by way of example in FIG. 2 can be assured with certainty. The pressure change met in the cylinder chamber corresponds to the curve $\beta$, while the liquid pressures appearing at the front and rear end of the master cylinder piston correspond to the curve denoted $\alpha$. When the vacuum in the reservoir 229 should be lost by a certain cause, the brake pedal 10 will advance a considerable angular stroke on account of the pushing action of the control piston 185 upon the piston 263, but the wheel braking action can nevertheless be performed.

In this case, when the brake pedal performs an override stroke beyond a predetermined value, the brake pedal will act upon the upper end of valve rod 310 which is then depressed downwards, the valve 312 being disengaged from its mating seat 311. Air will thus invade through port 316 into the chamber 306 in FIG. 9. Since the chamber 303 has a substantially atmospheric pressure thanks to the communication through the port 299 with the ambient atmosphere, the balanced condition is thereby broken, and the emergency rod 297 will move in the left-hand direction against the action of spring 298. Thus, the pressure in the chamber is increased, so as to perform a powerful braking action.

It will be obvious to those skilled in the art that many modifications may be made within the scope of the present invention without departing from the spirit thereof, and the invention includes all such modifications.

What we claim is:

1. In a pneumatic booster assembly for a vehicle wheel brake system having a manually operated hydraulic master cylinder assembly, a pneumatic servo operatively connected with said master cylinder assembly, a pneumatic supply source for actuating said pneumatic servo, said master cylinder communicating with at least one wheel brake actuating cylinder, said master cylinder assembly comprising, a hydraulic cylinder means, at least two hydraulic pistons slidably contained within said cylinder means in axial alignment with each other, a first hydraulic pressure chamber formed between one of said pistons and said cylinder means, said first hydraulic chamber being hydraulically communicated with said wheel brake actuating cylinder, said pneumatic servo operatively connected with said one of said hydraulic pistons, a second hydraulic pressure chamber located in said master cylinder assembly, means for communicating said second hydraulic chamber with both of said two hydraulic pistons, the other of said two hydraulic pistons being operatively connected to a means for manually actuating said master cylinder, a hydraulic fluid reservoir connected with said one hydraulic chamber, a pneumatic control valve operatively connected to the other of said two hydraulic pistons for actuation when said piston is manually operated by said manual actuating means, pneumatic passage means communicating said pneumatic source with said pneumatic servo, said pneumatic control valve located in said pneumatic passage means to control the operation of said pneumatic servo, passage means for communicating said first hydraulic chamber with said second hydraulic chamber, and a pressure responsive valve means located in said passage means between said first and said second hydraulic chambers, said pressure responsive valve means responsive to an increase in pressure in said first hydraulic chamber to interrupt fluid communication through said passage means when the actuation of said one of said hydraulic pistons by said pneumatic servo in response to the operation of said pneumatic control valve causes an increase in pressure in said first chamber above a predetermined value, whereby, said two hydraulic pistons are hydraulically locked together through said second hydraulic chamber to move in unison to enable the pressure in said first hydraulic chamber to be further increased relative to an increase in the manual braking effort being applied to said manual actuating means.

2. Pneumatic booster assembly as set forth in claim 1, wherein said two hydraulic pistons are telescopically mounted to each other, said second chamber being formed between said two hydraulic pistons for communication therewith.

3. Pneumatic booster assembly as set forth in claim 1 further comprising passage means connecting said second hydraulic chamber with said wheel brake cylinder means.

4. Pneumatic booster assembly as set forth in claim 1, further comprising a third hydraulic piston slidably mounted in said cylinder means and dividing said first hydraulic chamber into two separated first and second chamber elements, said first chamber element being hydraulically connected with said pressure responsive valve means and said second chamber element being hydraulically connected with additional wheel brake cylinder means, and a change-off valve located in said passage means between said first hydraulic chamber and said pressure responsive valve means, said change-off valve being connected with both wheel brake cylinder means for establishing fluid connection between said pressure responsive valve means, one of said wheel brake cylinder means, and said second hydraulic chamber, should another wheel brake cylinder means fail to receive hydraulic brake pressure.

5. Pneumatic booster assembly as set forth in claim 4, wherein the cylinder of said servo motor, the cylinder for said first hydraulic piston, said first hydraulic piston, and said second hydraulic piston are concentrically arranged within the range of said second hydraulic chamber one after another for attaining the compactness of overall size of said booster assembly.

6. Pneumatic booster assembly as set forth in claim 1, wherein said one of said hydraulic pistons comprises a first piston element and a second piston element mounted telescopically with each other, said second hydraulic chamber is formed between said other piston and said first piston element, and said second piston element is slidably mounted in said cylinder means and said hydraulic master cylinder assembly further comprising a third hydraulic piston slidably mounted in said cylinder means and dividing said first hydraulic chamber into two separated first and second chamber elements, said first chamber element being hydraulically connected with said pressure responsive valve means and said second chamber element being hydraulically connected with additional wheel brake cylinder means, and a third hydraulic chamber formed between said first and second piston elements of said one hydraulic piston, said third hydraulic chamber being permanently connected hydraulically with said second chamber element.

7. Pneumatic booster assembly as set forth in claim 1 further comprising a second cylinder slidably receiving said one of said two hydraulic pistons.

8. Pneumatic booster assembly as set forth in claim 7, further comprising a third piston slidably mounted in said second cylinder, said second hydraulic chamber being divided into first and second chamber elements, said first chamber element being hydraulically connected with said pressure responsive valve means and said second element being hydraulically connected with a separate brake cylinder means.

9. Pneumatic booster assembly as set forth in claim 1, further comprising a pneumatically operated emergency piston cylinder assembly, said assembly including a spring-loaded vacuum chamber connected to a vacuum source and an atmospheric pressure chamber separated from each other by a piston located in said cylinder, said last mentioned piston being mechanically connected in its operating direction with said second hydraulic piston, said emergency piston cylinder assembly being brought into operation when said servo motor becomes disabled to provide its boosting function.

10. Pneumatic booster assembly as set forth in claim 9, further comprising an emergency valve means inserted in a piping means connecting between said spring-loaded vacuum chamber and its vacuum source, and a valve rod included in said valve means, said valve rod being arranged to be operated upon by said manually operative member in an emergency when said servo motor becomes disabled to feed atmospheric pressure to said vacuum chamber for advancing said second hydraulic piston so as to increase the pressure chamber and thus the wheel brake cylinder pressure for performing an emergency brake application.

11. Pneumatic booster assembly as set forth in claim 1, wherein said pressure responsive valve means comprises: a valve member, a valve piston, a valve diaphragm and a valve vacuum chamber, said valve member being kept in pressure contact with said valve piston by means of a spring, said valve piston being urged to move towards its valve closing position by the pressure in said first hydraulic chamber, and said valve piston being rigidly connected with said valve diaphragm.

12. Pneumatic booster assembly as set forth in claim 1, wherein said pressure responsive valve means comprises: a valve piston, a valve head and a resilient means, said valve head being integral with said valve piston at the one end thereof, said valve piston being kept in pressure contact with said resilient means at the other end and being urged to move said valve head towards its valve closing position against said pressure of said resilient means by the pressure in said first hydraulic chamber.

13. Pneumatic booster assembly as set forth in claim 1, wherein said pressure responsive valve means comprises: a valve piston, a vacuum piston, a vacuum chamber and a spring, said vacuum chamber being separated into two elements by said vacuum piston and the one chamber element thereof being communicated with the vacuum section of said pneumatic servo motor, said valve piston being kept in pressure contact with said spring, said valve piston being rigidly connected with said vacuum piston and being urged to move towards its valve closing position against said pressure of said spring by the atmospheric air invading the one vacuum chamber element through said vacuum section of said pneumatic servo motor.

14. In a pneumatic booster assembly for a vehicle brake system having a manually operated member, a push rod operatively connected with said member, a first hydraulic piston operatively connected with said push rod, a second hydraulic piston mounted for movement relative to said first piston, cylinder means slidably containing said second piston, a first hydraulic chamber formed between said second piston and said cylinder means, a second hydraulic chamber formed between said first and second pistons, air control valve means movably mounted within said cylinder means and adapted for cooperation with a valve seat formed integral with said cylinder means when said manually operative member is actuated, and a pneumatic servo motor mechanically coupled with said second piston, said first hydraulic chamber being hydraulically connected to wheel brake cylinder means, said air control valve being actuated upon actuation of said manually operative member for actuating in turn, said pneumatic servo motor, and said second hydraulic piston being thereby actuated in a boosted manner for increasing the hydraulic pressure in said first hydraulic chamber, wherein the improvement comprises, a passage means for normally establishing fluid communication between said first and second chambers, and a pressure responsive valve means provided in said passage means and responsive to the pressure in said first hydraulic chamber, said pressure responsive valve means being actuated when the pressure in said first hydraulic chamber is caused to exceed a predetermined value by said pneumatic servo motor for interrupting the fluid communication through said passage means, thereby locking said first and second hydraulic pistons with each other for forming a unitary movement and thus further increasing the pressure in said first hydraulic chamber to increase correspondingly the braking effort.

References Cited

UNITED STATES PATENTS

| | | | |
|---|---|---|---|
| 3,174,285 | 3/1965 | Stelzer | 60—54.6P |
| 3,162,018 | 12/1964 | Daley, Jr. | 60—54.6P |
| 3,237,526 | 3/1966 | Hayes et al. | 60—54.6P |
| 3,387,455 | 6/1968 | Eggstein | 60—54.6P |
| 3,408,815 | 11/1968 | Stelzer | 60—54.6E |

MARTIN P. SCHWADRON, Primary Examiner

R. BUNEVICH, Assistant Examiner

U.S. Cl. X.R.

60—54.6